United States Patent
Tatem

(10) Patent No.: US 9,992,525 B1
(45) Date of Patent: Jun. 5, 2018

(54) METHOD AND SYSTEM FOR INSERTING LOCAL CHANNEL INSERTION IN A MULTI-TERMINAL SYSTEM

(75) Inventor: Richard B. Tatem, Middletown, MD (US)

(73) Assignee: The DIRECTV Group, Inc., El Segundo, CA (US)

( * ) Notice: Subject to any disclaimer, the term of this patent is extended or adjusted under 35 U.S.C. 154(b) by 596 days.

(21) Appl. No.: 12/210,867

(22) Filed: Sep. 15, 2008

(51) Int. Cl.
*H04N 21/422* (2011.01)
*H04N 21/436* (2011.01)
*H04N 21/462* (2011.01)
*H04N 21/482* (2011.01)

(52) U.S. Cl.
CPC ..... *H04N 21/422* (2013.01); *H04N 21/43615* (2013.01); *H04N 21/4622* (2013.01); *H04N 21/482* (2013.01)

(58) Field of Classification Search
CPC ............. H04N 21/235; H04N 21/2543; H04N 21/4126; H04N 21/4147; H04N 21/42204; H04N 21/4316; H04N 21/4334; H04N 21/435; H04N 21/4622; H04N 21/47202; H04N 21/47214; H04N 21/478; H04N 21/482; H04N 21/4821; H04N 21/6547; H04N 21/8166; H04N 21/84
USPC .................. 725/37, 40–41, 43, 86, 114–115, 725/131–134; 370/352, 401; 707/821–825
See application file for complete search history.

(56) References Cited

U.S. PATENT DOCUMENTS

| | | | |
|---|---|---|---|
| 5,058,138 | A | 10/1991 | Figura et al. |
| 5,524,272 | A | 6/1996 | Podowski et al. |
| 5,742,680 | A | 4/1998 | Wilson |
| 5,883,677 | A | 3/1999 | Hofmann |
| 5,970,386 | A | 10/1999 | Williams |
| 6,104,908 | A | 8/2000 | Schaffner et al. |

(Continued)

FOREIGN PATENT DOCUMENTS

| | | |
|---|---|---|
| EP | 1605603 A1 | 12/2005 |
| WO | 2004054157 A2 | 6/2004 |
| WO | 2007050081 | 5/2007 |

OTHER PUBLICATIONS

Anonymous; "ANGA Sees European Launch of RGB Networks USM—The Cable Industry's Highest Density QAM Modulator"; IPTV Industry; May 22, 2007; XP002524087; Retrieved from the Internet: URL:http://www.iptv-industry.com/pr/6d.htm; the whole document.

(Continued)

*Primary Examiner* — Hai V Tran
(74) *Attorney, Agent, or Firm* — Harness, Dickey & Pierce, PLC

(57) ABSTRACT

A method and system for providing local content in a local network includes a plurality of terminals and a receiving unit in communication with the plurality of terminals receiving first program guide data and communicating the first program guide data to the plurality of terminals. The system also includes a local video source generating a video signal. The system also includes a local server in communication with the plurality of terminals and the local video source generating second program guide data corresponding to local content and communicating the second program guide data to the plurality of terminals. The plurality of terminals displays a grid guide comprising the first program guide data modified by the second program guide data.

20 Claims, 8 Drawing Sheets

| | Channel | Network | 8:00 p.m. | 9:00 p.m. |
|---|---|---|---|---|
| 500 → | | | | |
| 502 → | 7 | ABC | Movie | |
| 504 → | 8 | Hotel Information | | |
| 506 → | 9 | Society Of Engineers Conference Video | | |
| 510 → | 10 | CBS | Survivor | |

(56) References Cited

U.S. PATENT DOCUMENTS

| | | | |
|---|---|---|---|
| 6,112,232 | A | 8/2000 | Shahar et al. |
| 6,219,839 | B1 | 4/2001 | Sampsell |
| 6,622,307 | B1 | 9/2003 | Ho |
| 6,868,255 | B1 | 3/2005 | Chanteau et al. |
| 6,980,553 | B2 | 12/2005 | Miki et al. |
| 7,533,400 | B1 | 5/2009 | Hailey et al. |
| 7,546,623 | B2 | 6/2009 | Ramraz et al. |
| 7,890,552 | B2* | 2/2011 | Reichman .......... H04N 7/17318 707/821 |
| 8,046,806 | B2 | 10/2011 | Wall et al. |
| 8,087,048 | B2 | 12/2011 | Hassell et al. |
| 2002/0019984 | A1 | 2/2002 | Rakib |
| 2002/0026645 | A1 | 2/2002 | Son et al. |
| 2002/0046406 | A1 | 4/2002 | Chelehmal et al. |
| 2002/0080267 | A1 | 6/2002 | Moluf |
| 2002/0087999 | A1 | 7/2002 | Kashima |
| 2002/0116707 | A1 | 8/2002 | Morris et al. |
| 2003/0053562 | A1 | 3/2003 | Busson et al. |
| 2003/0140345 | A1 | 7/2003 | Fisk et al. |
| 2003/0192053 | A1 | 10/2003 | Sheppard et al. |
| 2004/0006772 | A1 | 1/2004 | Ansari et al. |
| 2004/0117838 | A1 | 6/2004 | Karaoguz et al. |
| 2004/0133911 | A1 | 7/2004 | Russ et al. |
| 2004/0163125 | A1 | 8/2004 | Phillips et al. |
| 2004/0172658 | A1 | 9/2004 | Rakib et al. |
| 2004/0250273 | A1* | 12/2004 | Swix .................. H04N 21/4122 725/25 |
| 2004/0250282 | A1 | 12/2004 | Bankers et al. |
| 2004/0252243 | A1 | 12/2004 | Stewart |
| 2005/0028206 | A1 | 2/2005 | Cameron et al. |
| 2005/0028208 | A1 | 2/2005 | Ellis et al. |
| 2005/0216937 | A1 | 9/2005 | Shintani et al. |
| 2005/0283791 | A1 | 12/2005 | McCarthy et al. |
| 2006/0041925 | A1* | 2/2006 | Suh ............................. 725/132 |
| 2006/0095945 | A1 | 5/2006 | Carpenter et al. |
| 2006/0126551 | A1 | 6/2006 | Delaunay et al. |
| 2006/0156357 | A1 | 7/2006 | Lockridge et al. |
| 2006/0271954 | A1 | 11/2006 | Lankford et al. |
| 2007/0033621 | A1 | 2/2007 | Roeck |
| 2007/0039027 | A1 | 2/2007 | Zeyher et al. |
| 2007/0074240 | A1 | 3/2007 | Addington et al. |
| 2007/0101398 | A1 | 5/2007 | Islam |
| 2007/0107019 | A1 | 5/2007 | Romano et al. |
| 2007/0115933 | A1* | 5/2007 | Muhamed .......... H04L 29/06027 370/352 |
| 2007/0162928 | A1 | 7/2007 | Mickle et al. |
| 2007/0164609 | A1 | 7/2007 | Shalam et al. |
| 2007/0266414 | A1 | 11/2007 | Kahn et al. |
| 2008/0022322 | A1* | 1/2008 | Grannan ............ H04N 5/44591 725/78 |
| 2008/0040758 | A1 | 2/2008 | Beetcher et al. |
| 2008/0109854 | A1 | 5/2008 | Casavant et al. |
| 2008/0120675 | A1 | 5/2008 | Morad et al. |
| 2008/0127277 | A1 | 5/2008 | Kuschak |
| 2008/0134249 | A1 | 6/2008 | Yang et al. |
| 2008/0301748 | A1 | 12/2008 | Lida et al. |
| 2008/0309759 | A1* | 12/2008 | Wilson ............... G08B 13/1968 348/143 |
| 2009/0070442 | A1 | 3/2009 | Kacin |
| 2009/0070817 | A1 | 3/2009 | Ellis et al. |
| 2009/0081947 | A1 | 3/2009 | Margis |
| 2009/0141735 | A1 | 6/2009 | Kolhi |
| 2009/0278992 | A1 | 11/2009 | Gutknecht et al. |
| 2009/0320055 | A1 | 12/2009 | Langille et al. |
| 2009/0320058 | A1 | 12/2009 | Wehmeyer et al. |
| 2010/0111504 | A1 | 5/2010 | Yu et al. |
| 2010/0251315 | A1 | 9/2010 | Ohmae |
| 2010/0251316 | A1 | 9/2010 | Nicol et al. |
| 2011/0099575 | A1 | 4/2011 | Woo et al. |
| 2011/0131603 | A1 | 6/2011 | Dai |
| 2011/0131611 | A1 | 6/2011 | Jaffery |
| 2011/0239251 | A1 | 9/2011 | Miller |
| 2011/0239258 | A1 | 9/2011 | Fisk et al. |
| 2011/0314492 | A1 | 12/2011 | Cassidy et al. |
| 2012/0102523 | A1 | 4/2012 | Herz et al. |
| 2012/0240168 | A1 | 9/2012 | White et al. |
| 2012/0324510 | A1 | 12/2012 | Leley et al. |
| 2013/0237185 | A1 | 9/2013 | Morris et al. |

OTHER PUBLICATIONS

Anonymous; "Continuum DVP Dense QAM Array for Video-on-Demand Delivery"; Scientific Atlanta; Jun. 30, 2002; XP002524543; Retrieved from the Internet: URL:http://www.scientificatlanta.com/customers/source/7000183.pdf; the whole document.

Non-final Office action dated Nov. 22, 2010 in U.S. Appl. No. 12/210,850, filed Sep. 15, 2008 by Richard B. Tatem.

Final Rejection dated Mar. 29, 2011 in U.S. Appl. No. 12/210,850, filed Sep. 15, 2008 by Richard B. Tatem.

Anonymous; "Motorola SmartStream Encryptor Modulator"; Jul. 1, 2003; XP55008043; retrieved from the Internet: URL:http://broadband.motorola.com/catalog/product_documents/SEM_wp_july03.pdf [retrieved on Sep. 26, 2011].

European Telecommunications Standards Institute (ETSI); "HFC (Cable TV) Access Networks; Part 1: Interworking the PSTN N-ISDN, Internet and Leased line Networks [Network aspects]"; ETSI Draft; TD05M; 650 Route Des Lucioles, F-06921, Sophia-Antipolis, France; No. V1.1.1; Oct. 9, 1998; pp. 1-41, XP014057863; [retrieved on Oct. 9, 1998].

International Search Report and Written Opinion dated Feb. 21, 2013 in International Patent Application No. PCT/US2012/060448 filed Oct. 16, 2012 by Richard B. Tatem et al.

Non-final Office action dated Jan. 15, 2013 in U.S. Appl. No. 13/285,955, filed Oct. 31, 2011 by Richard B. Tatem et al.

Non-final Office action dated Jan. 11, 2013 in U.S. Appl. No. 13/285,931, filed Oct. 31, 2011 by Ronald J. Hubach et al.

Final Rejection dated Jul. 15, 2013 in U.S. Appl. No. 13/285,931, filed Oct. 31, 2011 by Ronald J. Hubach et al.

Notice of Allowance dated Jul. 23, 2013 in U.S. Appl. No. 13/285,955, filed Oct. 31, 2011 by Richard B. Tatem et al.

Non-final Office action dated Jan. 15, 2014 in U.S. Appl. No. 13/285,931, filed Oct. 31, 2011 by Ronald J. Hubach et al.

Final Rejection dated Jan. 29, 2016 in U.S. Appl. No. 12/210,850, filed Sep. 15, 2008 by Richard B. Tatem.

Non-final Office action dated Jul. 1, 2016 in U.S. Appl. No. 12/210,850, filed Sep. 15, 2008 by Richard B. Tatem.

Notice of Allowance dated May 27, 2014 in U.S. Appl. No. 13/285,931, filed Oct. 31, 2011 by Ronald J. Hubach et al.

* cited by examiner

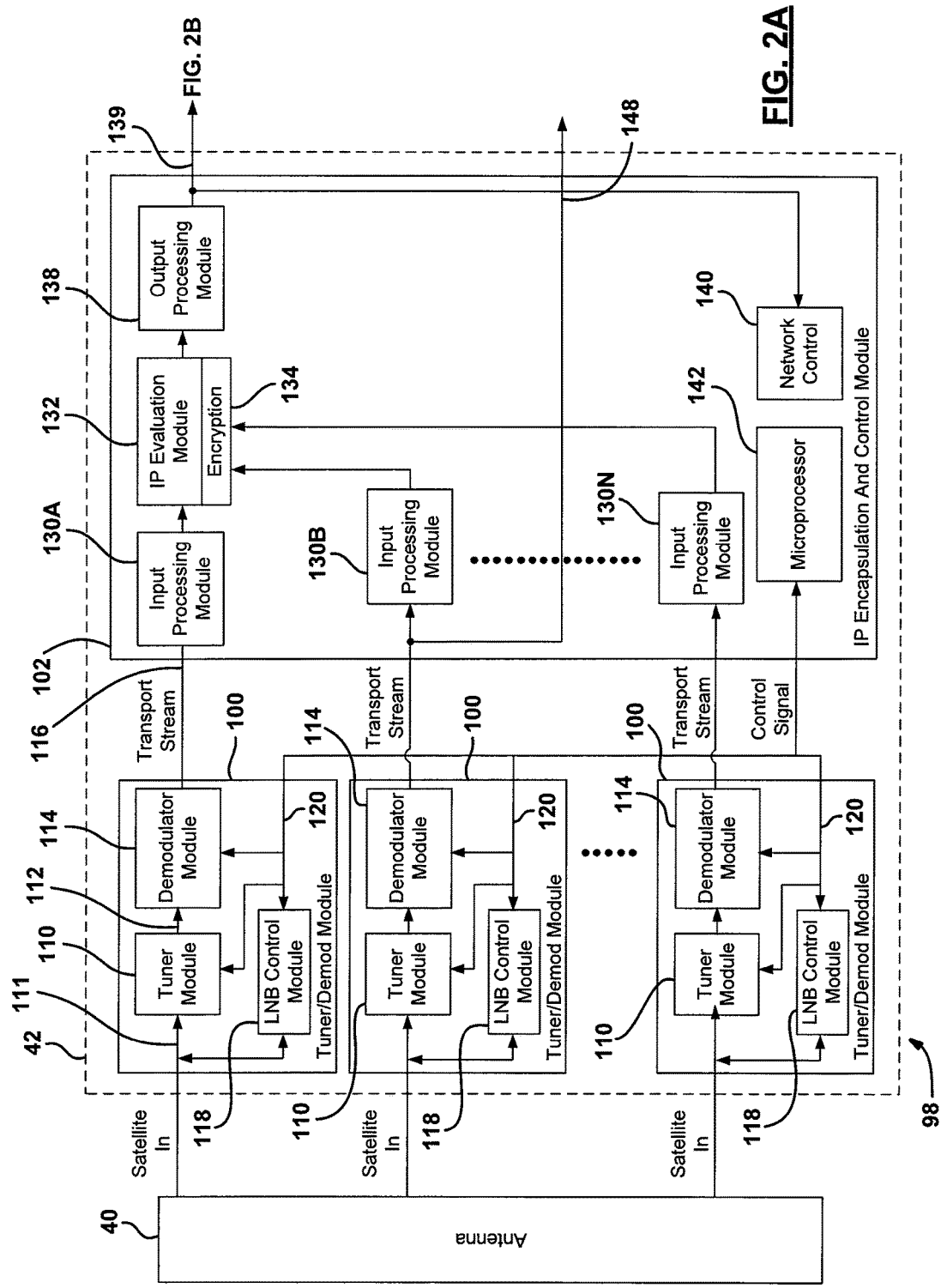

| Channel | Network | 8:00 p.m. | 9:00 p.m. |
|---|---|---|---|
| 7 | ABC | Movie | |
| 8 | Hotel Information | | |
| 9 | Society Of Engineers Conference Video | | |
| 10 | CBS | Survivor | |

FIG. 7

METHOD AND SYSTEM FOR INSERTING LOCAL CHANNEL INSERTION IN A MULTI-TERMINAL SYSTEM

TECHNICAL FIELD

The present disclosure relates generally to satellite television systems and, more particularly, to a satellite television system acting as a local head end to distribute various channels that include locally inserted channels or content throughout a multi-terminal system or network.

BACKGROUND

Satellite television has become increasingly popular due to its wide variety of programming. Typical satellite receivers are designed as one integrated unit. That is, the various tuning functions, conditional access functions and processing are all performed on the same circuit board.

For certain types of applications, an IP encapsulated bitstream is desirable. The IP bitstream is distributed to various monitors for playback. The IP solutions are typically targeted at large installations to support hundreds of simultaneous users. Such systems are typically not economical for low-end installation requiring only a modest number of receivers. Such applications include low-end commercial applications such as bars, waiting rooms and single-family homes. A set top box capable of converting the IP stream to usable signals is typically used. Providing some basic service to applications such as multiple dwelling units is desirable.

Hotels and other applications may also use a satellite master antenna television (SMATV) system. In particular, hotels and other properties have a need to provide information to customers that are specific to the property. Other types of systems such as vehicle-based systems may include multiple terminals. Other types of systems may also have a need to provide specific local data.

SUMMARY OF THE DISCLOSURE

The present disclosure allows the insertion of local channel with video, audio, or audio and visual into a local system. The local system may be within a building, multiple dwelling unit, or multiple terminal system in a vehicle such as in an airplane, ship, train or the like.

In one aspect of the disclosure, a system for providing local content in a multi-terminal system includes a plurality of terminals and a receiving unit in communication with the plurality of terminals receiving first program guide data and communicating the first program guide data to the plurality of terminals. The system also includes a local video source generating a video signal. The system also includes a local server in communication with the plurality of terminals and the local video source generating second program guide data corresponding to local content and communicating the second program guide data to the plurality of terminals. The plurality of terminals display a grid guide comprising the first program guide data modified by the second program guide data.

In a further aspect of the disclosure, a method includes receiving first program guide data at a receiving unit corresponding to base content, generating second program guide data corresponding to local content, communicating the first program guide data to a plurality of terminals, communicating the second program guide data to the plurality of terminals and displaying a grid guide comprising the first program guide data modified by the second program guide data.

In yet another aspect of the disclosure, a method includes receiving a first signal to form a received signal, demodulating the received signal to form a transport stream signal, decoding the transport stream signal to form an analog signal and modulating the analog signal to from a modulated signal and communicating the modulated signal to a television tuner through a network.

Other features of the present disclosure will become apparent when viewed in light of the detailed description of the preferred embodiment when taken in conjunction with the attached drawings and appended claims.

BRIEF DESCRIPTION OF THE DRAWINGS

FIGS. 2A and 2B form a detailed block diagrammatic view of a receiving unit and associated distribution system.

FIG. 7 is a screen display of a program guide having general program guide information and local information displayed.

DETAILED DESCRIPTION

Figure 1:
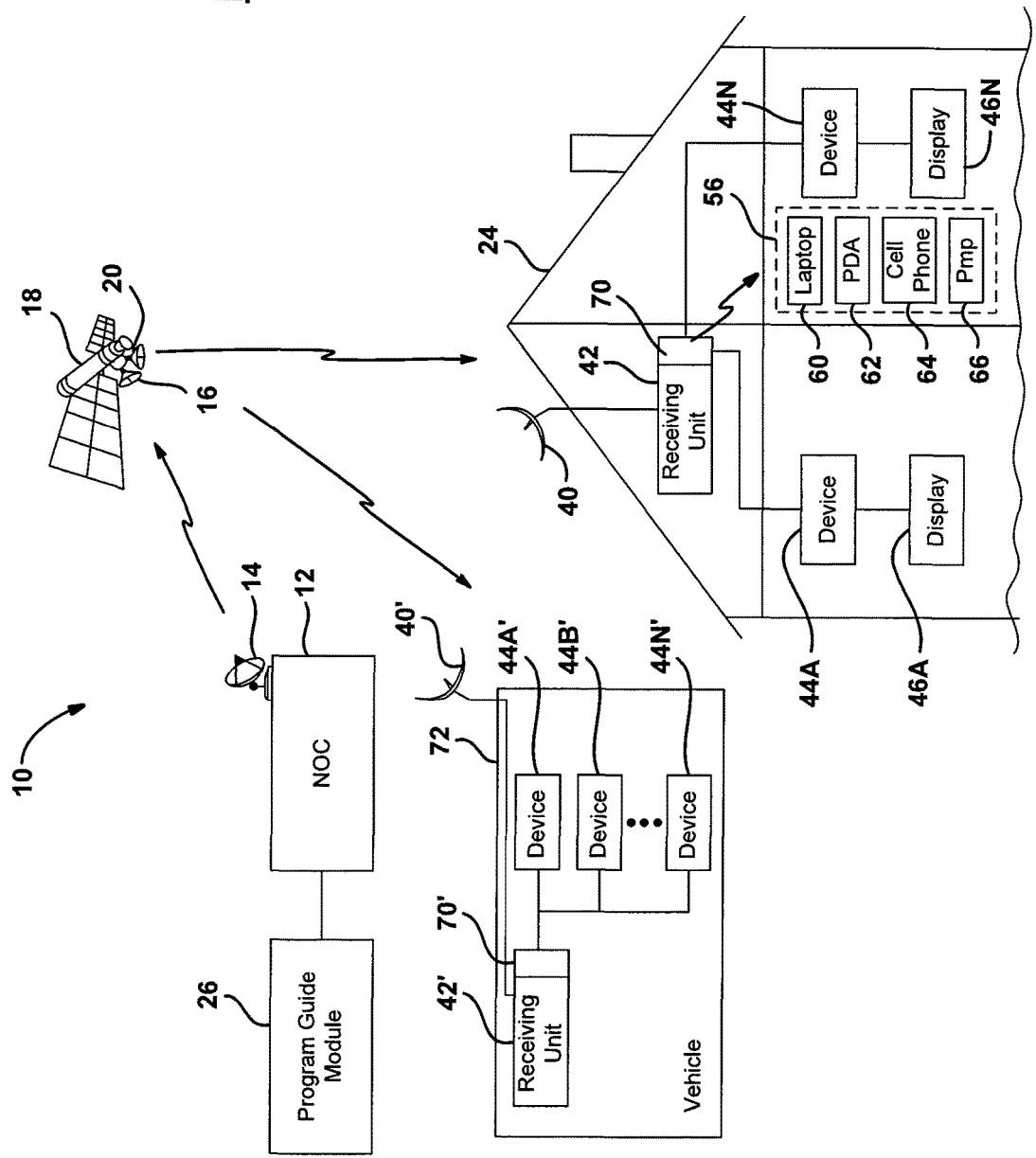
FIG. 1 is a system level view of a satellite broadcasting system according to the present disclosure.

In the following figures the same reference numerals will be used for the same views. The following figures are described with respect to a satellite television system. However, those skilled in the art will recognize that the teachings of the present disclosure may be applied to various types of systems including a cable system.

As used herein, the term module refers to an Application Specific Integrated Circuit (ASIC), an electronic circuit, a processor (shared, dedicated, or group) and memory that executes one or more software or firmware programs, a combinational logic circuit, and/or other suitable components that provide the described functionality. As used herein, the phrase or at least one of A, B, and C should be construed to mean a logical (A or B or C), using a non-exclusive logical OR. It should be understood that steps within a method may be executed in different order without altering the principles of the present disclosure.

Referring now to FIG. 1, a satellite television broadcasting system 10 is illustrated. The satellite television broadcasting system 10 includes a network operations center 12 that generates wireless uplink signals through a transmitting antenna 14 which are received by a receiving antenna 16 of a satellite 18. The wireless signals, for example, may be digital and in a first format used for satellite communications. A transmitting antenna 20 generates wireless downlink signals directed to various receiving systems including stationary systems such as those in a home 22 as well as multiple dwelling units and commercial buildings 24. The wireless signals may have various types of information associated with them including various channel information such as a channel or program guide, metadata, location information and the like. The wireless signals may also have various video and audio signal information associated therewith. The wireless signals may also include program guide data from a program guide module 27. The program guide module may communicate various object to the network operation center 12 so that a grid guide may be displayed on a display associated with a receiving device. Various types of data may be communicated about the programming and grid guide including the channel number, a network identifier, program data such as a start and end time of airing, title, numerical identifier, content data such as actors, descriptions, ratings and the like. Grid guide data may include the relative positions of the data, the line structures and the like.

Building 24 includes a receiving antenna 40 that receives the wireless signals from the satellite 18 and processes the signals in a receiving unit 42. An IP encapsulated bitstream may be generated at the receiving unit 42 to provide signals in a second format. A plurality of devices 44A-44N in communication with the receiving unit 42 receives the IP encapsulated bitstream and controls a display 46A-46N in response to the bitstream. The displays 46A-46N may include either an audio or a video display, or both.

As was mentioned above, the system may also apply to a cable or wired system. In such a case, the antenna 40 would be replaced with a cable connection. The system may also be used in a terrestrial broadcast system. In such a case, the satellite antenna 18 would be replaced by a terrestrial signal receiving antenna.

The present disclosure may also be used for displaying various wireless information on a personal mobile device 56, such as a laptop computer 60, a personal digital assistant 62, a cellular telephone 64 or a portable media device 66. It should be noted that the personal mobile devices 56 may receive wireless signals having various types of information from a router 70 that is in communication with the receiving device 42. The router 70 may be wireless.

The router 70 may also be a wired router for distributing signals to the plurality of devices 44A-44N. The router 70 may be an independent unit or incorporated into the receiving unit 42. An IP switch or router 70 may also be an optional feature depending on the system. The router, server, receiving unit and the plurality of terminals may form a network. In this example, an IP network is formed.

The local content distribution system or multi-terminal system may also be disposed within a vehicle 72. The system may also include an antenna 40', receiving unit 42' and a plurality of terminals 44A', 44B' . . . 44N'. The vehicle may be different types of vehicles including an airplane, ship, train, bus, van or automobile.

Figure 2B:
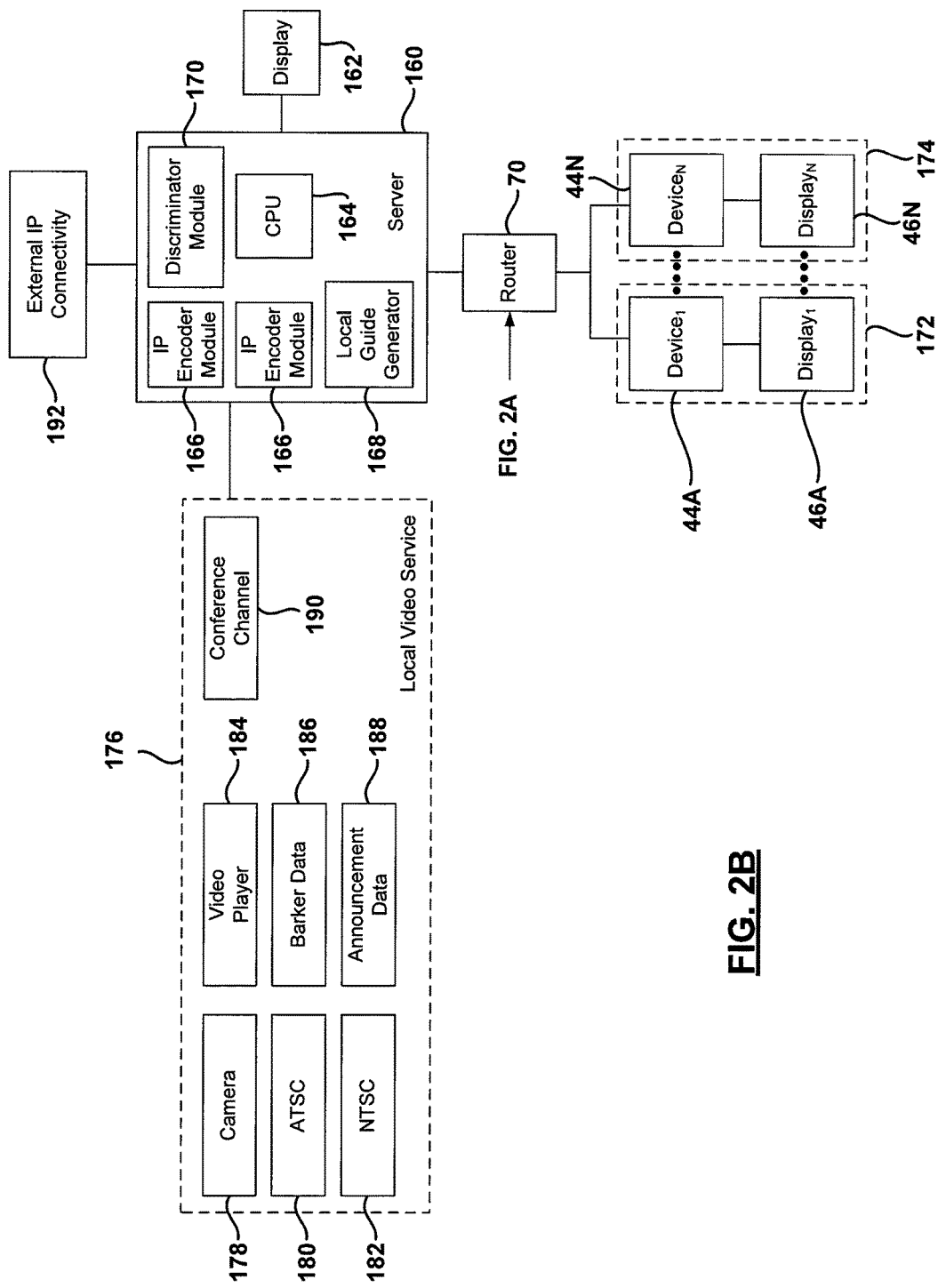

Referring now to FIGS. 2A and 2B, the present disclosure is applicable to a multi-terminal system 98 that includes a number of devices and a number of displays. Such a system may be suitable for multiple dwelling units, commercial buildings such as a bar, vehicles or large single-family homes. In this example, one or more antennas 40 may be coupled to a plurality of tuner demodulator modules 100 within the receiving unit 42. Antenna 40 may be various types of antennas. The antenna 40 may be a single antenna used for satellite television reception, or a number of antennas. The antenna 40 may also be an electronic or moving antenna. An electronic antenna or moving antenna may be particularly useful in a vehicle.

The receiving unit 42 of the system 98 is illustrated in further detail. The receiving unit 42 may be formed to be modular. The receiving unit 42 may include a plurality of tuner demodulator modules 100 formed on a first circuit board and an IP encapsulation and control module 102 formed on a second circuit board. The modules within the receiving unit may be arranged physically in any number of ways. The circuit boards may contain the components of their respective module. The circuit boards may be spaced apart and a connector, bus or communication link may be used to interconnect the two modules.

The tuner demodulator module 100 includes a tuner 110 that receives the signal or the satellite signal 111 for the selected channel and generates a tuner signal 112. The tuner signal 112 is provided to a demodulator module 114 that demodulates the tuner signal 112 to form a demodulated signal or transport stream 116.

A low noise block (LNB) control module 118 is in communication with the tuner module 110 and the demodulator module 114. The LNB control module 118 may control the tuner and demodulator functions according to received control signals 120. For example, the LNB control module 118 may switch the LNB contained in the antenna 40 to receive the proper signals requested by the IP encapsulation and control module 102. Further, guide data or conditional access data and other information may be requested from the IP encapsulation and control module and provided for in the low noise block control module 118. The LNB control module 118 may be used for powering the outdoor unit (the antenna 26) and selecting the particular orbital location if needed.

Each IP encapsulation and control module 102 includes a plurality of input processing modules collectively referred to with reference numeral 130. Each tuner demodulator module 100 may include a respective input processing module 130A through 130N. The input processing module 130 may act as a buffer for buffering the transport stream signal 116. The input processing module 130 also acts as a filter passing only those packets needed by downstream devices 30 or 44 and discarding the packets that are not needed by downstream devices.

An IP encapsulation module 132 receives the transport stream and repackages it using an internet protocol (IP) to form an IP encapsulated signal 136. A single IP encapsulation module or multiple IP encapsulation modules 132 may be provided. Additional network control messages may also be inserted by the IP encapsulation module 132. The IP encapsulation module 132 may provide various information in the form of a packet header. The packet header may include information such as the destination IP address, the source IP address, the type of protocol, various flags, check sums, metadata such as channel information, ratings, and the like. The destination address may be one address or group of addresses. Various types of transport packets may be formed depending on the desired characteristics of the system. TCP, UDP, DCCP, SCTP and the like may be used. An encryption module 134 may encrypt the encapsulated signal 136.

The IP encapsulated signal 136 is communicated on output processing module 138. The encryption module 134 is an optional module that may be separate from the IP encapsulation module 132 or included therein. The output processing module 138 may also act as a buffer for buffering output to the device 30. The output of 138 is IP stream 139.

A network control module 140 is used to monitor the IP network and accept commands from downstream equipment requesting channel changes, guide data, conditional access data and the like. The network control module 140 manages the aspects of the IP data sent to and from the system into the IP network.

A microprocessor 142 is in communication with the input processing module 130, the IP encapsulation module 132, the output processing module 138, and the network control module 140. The microprocessor 142 also generates control signals to the LNB control module 118 of the tuner demodulator module 100. The microprocessor 142 may also be in direct communication with the tuner module 110 and the demodulator module 114. The control protocol may include I²C industry standard or various other types of industry standards or custom standards suitable for this application.

The transport streams may correspond to one or more particular channel. The number of tuner demodulator modules 100 depends upon various system parameters. For example, if each device 44A-44N may be tuned to a different channel, then a separate tuner demodulator module 100' may be provided for each respective device 44 up to and including the total number of unique transponders (satellite system) or RF frequencies (cable, terrestrial) used by the system. If less than each of the devices may be used at any one particular time, the number of tuner demodulator modules 100 may be accordingly reduced. Likewise, in a sports bar setting, only a few different channels may be required. Therefore, a small number of tuner demodulator modules 100 may be provided.

One advantage to the system set forth in FIGS. 2A and 2B is that identical tuner demodulator modules 100 may be provided. These modules may, thus, be mass produced and because of the economies of scale, the cost is reduced. Also, standard configurations of the IP encapsulation and control module 102 may also be formed. The example shown in FIG. 2 includes one set of circuitry used to drive one device 44. Of course, multiple devices using the same channel may be operated using the IP encapsulation and control module 102. The IP encapsulation and control module 102 illustrated in FIG. 2 may be mass produced in standardized format. Each of the variances may be mass produced and, thus, the overall cost of the system is reduced, decreasing the number of customer configurations. The circuitry of the IP encapsulation and control module 102 is essentially repeated with additional input processing buffers 130A through 130N.

A router 70 is included in the system. The router 70 may be a hard-wired router or a wireless router. The wireless router forms a wireless local area network (WLAN). The wireless local area network may be coupled to various devices including the wireless devices 56 represented by reference numbers 60-66 in FIG. 1.

The transport stream 148 from the tuner demodulator module 100 may also be provided. This may be passed through the IP encapsulation and control module or provided directly from the tuner demodulator module 100.

The router 70 may also be in communication with a local server 160. The local server 160 may be a server having a display 162 associated therewith. The local server 160 may serve many purposes, including processing various data in a CPU 164, encoding through encoder modules 166 local video sources as will be described below. The server may also include a local guide generator 168 used to insert local channels within the program guide as will be further described below. A discriminator module 170 may also be included within the server 160. The discriminator module 170 may be used to provide capability to discriminate receiving sources of various content. For example, a first group 172 of devices may be established for receiving various information whereas a second group 174 of devices 44 may be provided to not receive information. Examples of uses of the discriminator module 170 may be for hotels to provide conference materials to various conference attendees, while preventing others not attending the conference from receiving the content. Services such as services provided to a concierge floor or an executive suite may be different than those offered to general guests.

The encoder module 166 may use various types of encoder modules that include MPEG2 encoders, MPEG4 encoders, AVI or H.264 type encoders. The encoders are in communication with a local video source 176. The local video source 176 may include one source or multiple sources. One example of a local video source 176 is a camera 178. The camera 178 may be directed to various places such as a front door security camera, a fitness center camera or a camera at a particular event. The local video source may also include an ATSC video source 180 or an NTSC source 182. These sources may be received over the air and provide local information throughout the communication system. The ATSC video source and NTSC source may generate signals on-site. A video player 184 may also act as a local video source 176. The video player 184 may be a digital video player, a digital video recorder, a tape player, or the like. An example of a suitable use for a video player 184 would be to provide a hotel guest with local attraction highlights.

The local video source 186 may also include barker data 186. Barker channels may be established for providing information regarding special events or the like in a bulletin board-type format. The barker channel may have various screen shots with or without audio to provide the devices within the distribution system with various information. For example, conference times, local menus or various other types of announcements may be provided within the barker data.

Announcement data 188 may also be separately provided within the local video source 176. The local video source announcement data 188 may provide various types of announcements throughout the system. These may include emergency alerts or the like.

A conference channel 190 may also be separately provided within the local video source 176. The conference channel 190 may include a channel dedicated to various conference attendees.

Although the local video source 176 is illustrated as a separate device, the various functionality may also be incorporated into the server 160. Because the server 160 may also act as a computer, announcement data and other types of data may be controlled and inserted to form various screens. A graphical user interface or the like may be provided to allow the operator of the server to easily insert information to be provided on various channels for guests or residents.

The server 160 may also be used to retrieve information with external IP connectivity 192. By providing IP connectivity, the Internet may be accessed by the server 160. The Internet may also be used to provide control of the server 160 from a remote location. Monitoring of the server 160 may also be provided from a remote location. As mentioned above, the server 160 may be used to create various numbers of channels that are located at various locations within a program guide. The discriminating module 170 is used to provide targeted information in a system as well. For example, one particular terminator device 44 of the plurality of devices or terminals may be targeted for a particular message such as "Rent is Due" or an emergency announcement. By allowing one device to receive the information and excluding others from receiving the information, such a targeted message may be provided. The targeted message may be provided based upon a MAC address or a receiver identifier.

Figure 3:
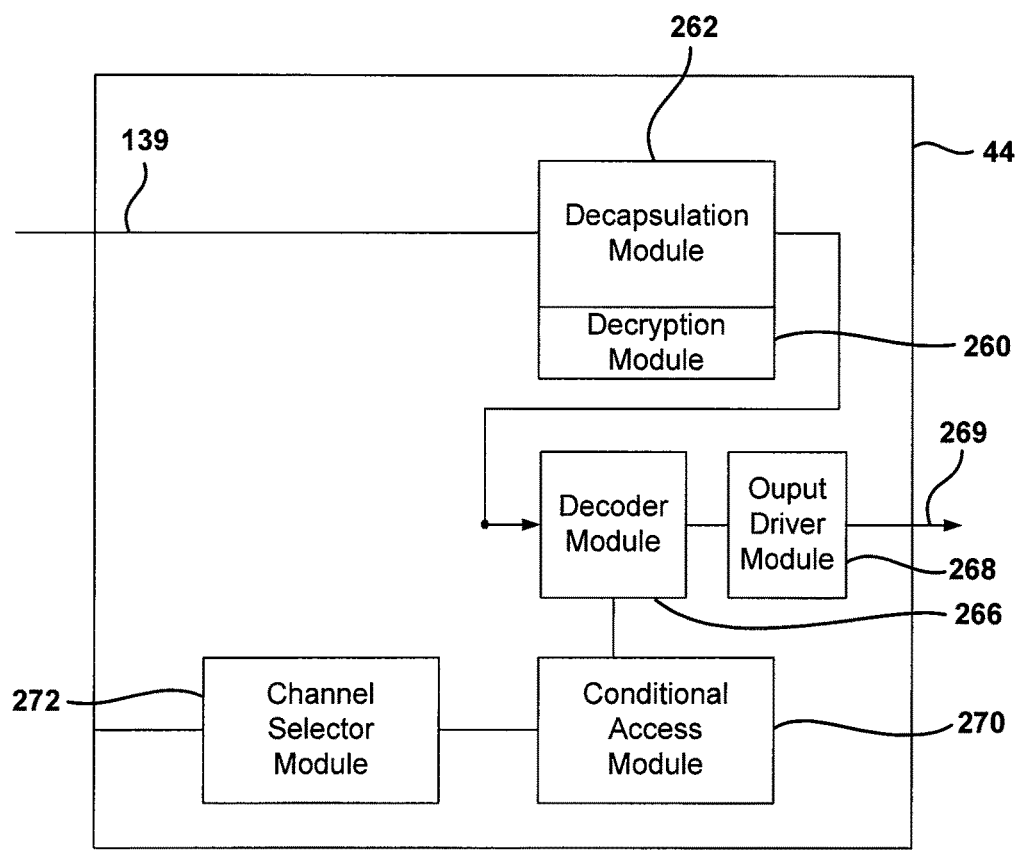
FIG. 3 is a block diagrammatic view of a device.

Referring now to FIG. 3, a local terminal or device 44 is illustrated in further detail. Device 44 may include a decryption module 260 if encryption is performed in the receiving unit 42. Decryption module 260 may not be included in a device 44 should the receiving device not include encryption. Each device 44 may have an address such as a MAC address for receiving addressed packets.

A decapsulation module 262 may be used to decapsulate the various IP packets in the IP encapsulated signal 139 from the receiving unit. The output of decapsulation module 262 is a transport stream containing audio/video data, guide information, conditional access information, etc. A decoder module 266, such as an MPEG decoder, receives the transport signal from the decapsulation module 262 and decodes the signal. The decoded signal is provided to an output driver module 268. The output driver module 268 generates various audio and video signals 269 for the display 32 illustrated in FIGS. 1 and 2. A conditional access module 270 may be included in the receiving device 44. Conditional access module 270 may take the form of a conditional access card or other security device. Without a conditional access module 270, the system may not function. Under certain conditions, the conditional access module 270 may be completely removed from the system or moved to the tuner demodulator module 100 or the IP encapsulation and control module 102.

A channel selector module 272 may also be included within the device 44. The channel selector module 272 may generate a channel control signal to communicate the channel desired at the particular device. The channel control signal may be provided to the receiving unit. More specifically, the channel control signal may be provided to the microprocessor 142 module. The input to the channel selector may come from a remote control or push button.

Figure 4:
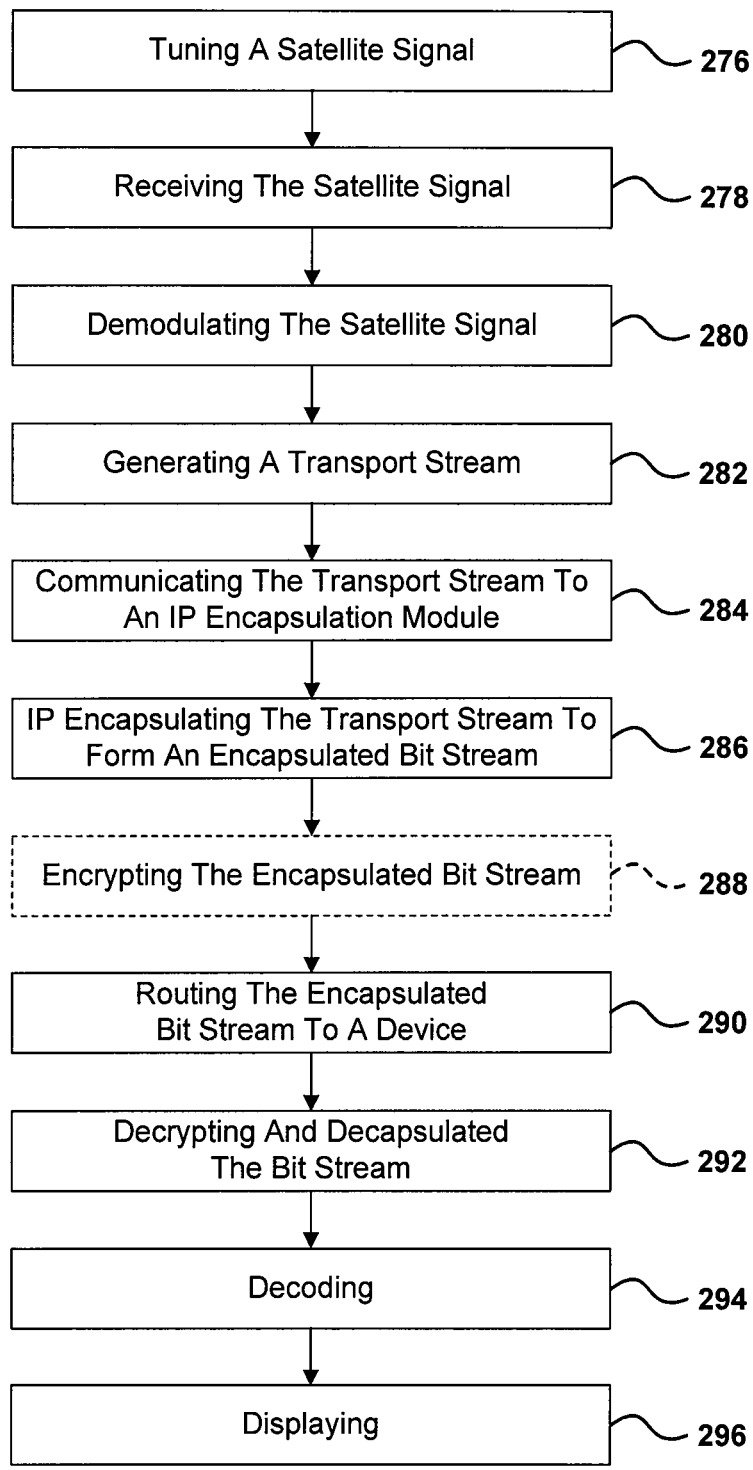
FIG. 4 is a flowchart of a method of receiving a signal according to one aspect of the disclosure.

Referring now to FIG. 4, a satellite signal is tuned in a tuner in step 276. As mentioned above, the signal may be a satellite signal or may also be some other terrestrial signal or cable television signal. In the following example, the satellite signal, rather than a cable or terrestrial signal, will be used. In step 278, the satellite signal is received. In step 280, the satellite signal is demodulated. A transport stream is generated in step 280. In step 284, the transport stream is communicated to the IP encapsulation module 132 of FIGS. 2 and 4. The IP encapsulation module 132 may be separated from the tuner demodulator module 100. In step 286, the transport stream is IP encapsulated to form an encapsulated bitstream.

If encryption is used in the system, step 288 encrypts the encapsulated bitstream. In step 290, the encapsulated bitstream is routed to a device. In step 292, if encrypting is used, the bitstream is decrypted. In step 292, the bitstream is also decapsulized.

In step 294, the bitstream is decoded. In step 296, the signal is displayed. The display may be an audio display or visual display.

It should be noted that some of the modules used in the above, such as the routers, IP encapsulating modules and the like, may also include some IP processing. The present examples provide additional processing to such devices.

Figure 5:
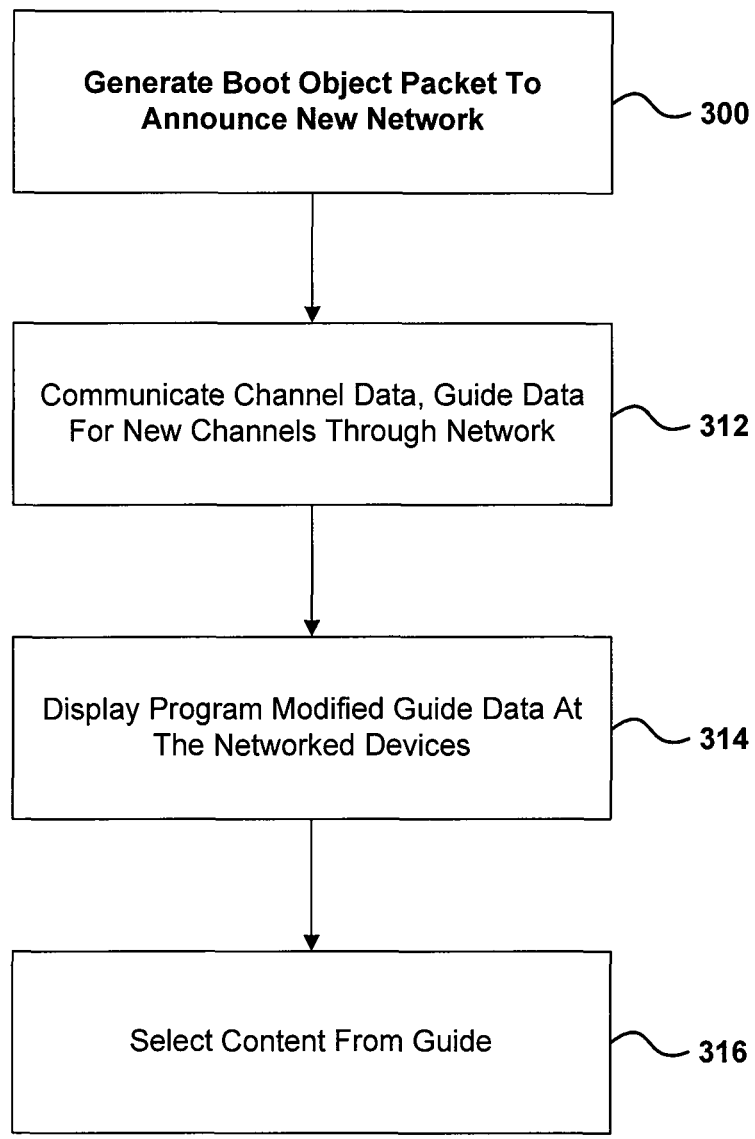
FIG. 5 is a flowchart of a method for communication program guide changes to the devices.

Referring now to FIG. 5, a method for changing the program guide is set forth. Each local multi-terminal system can be customized to create a number of local channels that may be listed in the program guide. The number of channels may be updated as needs change. In step 300, a boot object packet to announce a new network is generated. The new network may correspond to a new satellite network. That is, the devices 44 may be provided with the boot object which mimics a new satellite network being added. In reality an artificial broadcast network may be established by the boot object. A user interface in a computer program may generate queries for information regarding each new channel. Channel features such as the program name, duration, start time, end time and titles may be included. Channels may also be targeted to specific groups of users. That is, some groups of terminals may receive channels and others may be excluded from the channels. The address such as a MAC address or other identifier may be used to discriminate.

The local guide generator 168 of FIG. 2 may be used to generate the local guide information. The channels may correspond to one of the local video sources 176 illustrated in FIG. 2. In step 312, channel data, guide data and guide data for new channels are communicated throughout the network. Program guide objects may be communicated throughout the local network from the server along with standard guide information received through the receiving device 42 of FIG. 2. The second or new program guide data may be communicated in the boot object.

In step 314, program guide data may be modified at the terminals according to the program data communicated in step 312. Thus, the local program guide data together with the standard or base program guide data may be displayed at the networked devices after rebooting the terminal.

In step 316, the program guide with base data and local data may be used by the devices for viewing available content as well as selecting content to be viewed. Content may thus be received or selected from the program guide including local programming content.

Figure 6:
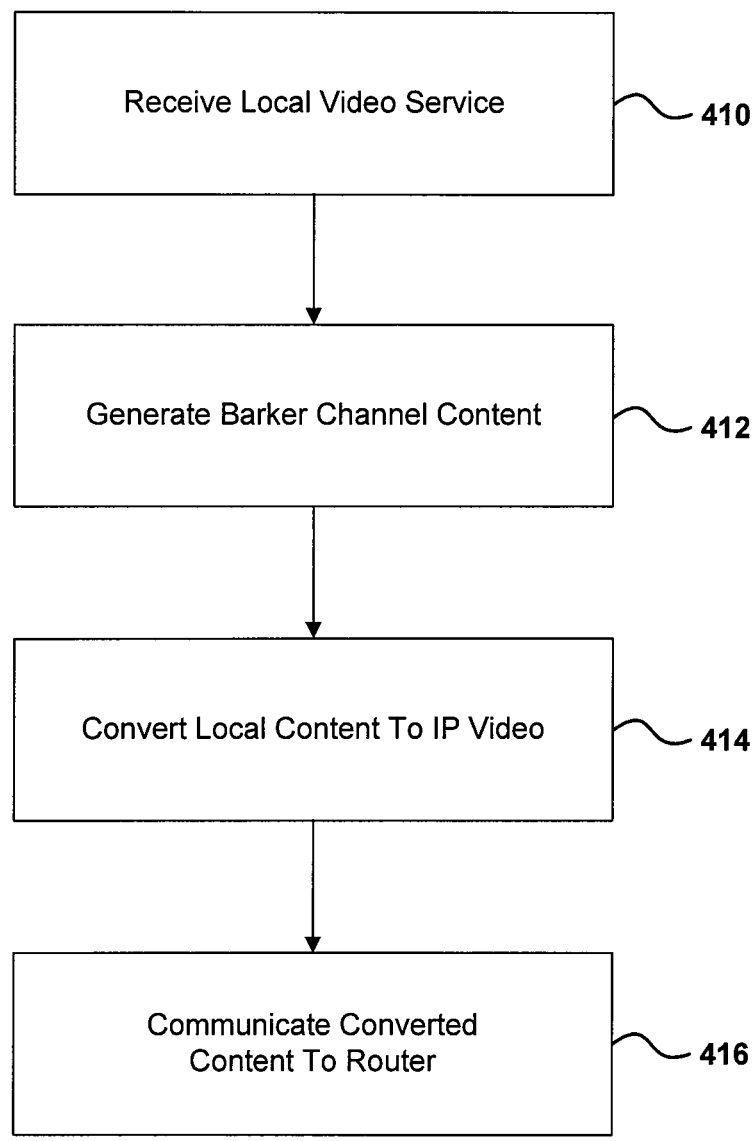
FIG. 6 is a flowchart of a method of communicating local content to various network devices.

Referring now to FIG. 6, the operation of the server 160 and the local video source 176 of FIG. 2 is illustrated. The server 160 may receive a local video source from one of the local video sources. As mentioned above, a camera, ATSC video, NTSC video, video player data, announcement data, conference channel data, or the like may all be sources of local video. In step 412, barker content may also be input through the server to provide barker channel information. One or both of steps 410 or 412 may be performed. In step 414, the local content is converted into an IP format. The IP format allows the content to be communicated through the router 70 to the various devices 44A-44N illustrated in FIG. 2. The content is converted to IP content using the encoders 166 provided within the server 160 illustrated in FIG. 2.

The IP content is communicated to the router 70 in step 416 and ultimately to the devices 44A-44N. The content may be communicated in response to a selection in the program guide or tuning to a particular channel. As mentioned above, access to particular channels may be restricted to certain groups of terminals.

A message for one or more terminals may also be generated in a similar manner by entering the address and message at the server. The message may or may not be presented at a program guide. An on-screen display for a certain time duration may appear on a channel or within the guide. The messages may be used for warning of an emergency or event such as "rent is due."

Referring now to FIG. 7, an example of a program guide 500 is illustrated with various rows 502, 504, 506, 510. As illustrated, rows 502 and 510 correspond to network programming. In this example, ABC and CBS programming is illustrated on channels 7 and 10 corresponding to rows 502 and 510, respectively. On channels 8 and 9, local content is provided within the program guide 500. In row 504, hotel information may be selected by selecting the row corresponding to 504. In step 506, members of a particular conference such as the "Society of Engineers" may receive a conference video corresponding to the conference in row 506. As mentioned above, a discriminator may be used for restricting the reception of various content to a particular group or groups of terminals or devices. In this example, if other guests outside of the conference are within the property, the IP address or MAC address of the device 44 associated with non-members may not be selected to be provided with program guide information or the video associated with row 506. The program guide row 506 may also be set not to appear for guests not associated with the conference. Thus, the program guide 500 would have rows 502, 504 and 510 with no row 506.

While particular embodiments of the disclosure have been shown and described, numerous variations and alternate embodiments will occur to those skilled in the art. Accordingly, it is intended that the disclosure be limited only in terms of the appended claims.

What is claimed is:

1. A method comprising:
   receiving first program guide data including a standard grid guide in a first program guide object at a receiving unit corresponding to base content;
   communicating the first program guide object to a plurality of terminals of a local system, each of the plurality of terminals associated with a respective display device;
   receiving local content at a local server from a local video service, the local server separate from the plurality of terminals;
   communicating local channel grid guide data to the local server using a user interface, said local channel grid guide data comprising channel features of a new local channel comprising a channel number, a program name, a network identifier, a description and a start time;
   providing, using the local server, a boot object for mimicking an artificial broadcast network being added to the local server;
   generating a program guide object at the local server comprising the local channel grid guide data;
   announcing the artificial broadcast network by communicating the boot object from the local server to the plurality of local terminal;
   providing, the local channel grid guide data to the plurality of terminals by communicating the program guide object from the local server to the plurality of terminals;
   rebooting the plurality of local terminals;
   modifying, in response to rebooting at the plurality of terminals, the standard grid guide comprising the first program guide data with the local channel grid guide data to form a modified grid guide using the program guide object;
   displaying the modified grid guide on displays of the plurality of terminals based on the network identifier and channel number of the new local channel; and
   communicating the local content to the plurality of terminals from the local server through a local area network using an internet protocol.

2. A method as recited in claim 1 wherein receiving first program guide data comprises receiving first program guide data at a first receiving unit within a building; and
   wherein providing the boot object generating second program guide data within the building.

3. A method as recited in claim 2 further comprising receiving local content from a local video source within the building.

4. A method as recited in claim 2 wherein communicating the first program guide data to a plurality of terminals comprises communicating the first program guide data to a plurality of terminals within the building through the local area network.

5. A method as recited in claim 1 wherein communicating local content comprises communicating a camera output.

6. A method as recited in claim 1 wherein communicating local content comprises communicating a local information channel.

7. A method as recited in claim 1 further comprising communicating base content to the plurality of terminals through the receiving unit.

8. A method as recited in claim 7 wherein communicating base content comprises communicating base content using an internet protocol.

9. A method as recited in claim 7 wherein prior to communicating base content, receiving base content from a satellite.

10. A method as recited in claim 7 wherein prior to communicating base content, receiving base content in a first format and transcoding the base content to a second format.

11. A method as recited in claim 1 wherein communicating the boot object comprises communicating the boot object to a first group of the plurality of terminals and not communicating the boot object to a second group of the plurality of terminals.

12. A method as recited in claim 1 wherein the local channel further comprises a short description, a long description, a duration, and an end time.

13. A system for providing local content in a local network comprising:
   a plurality of terminals, each of the plurality of terminals associated with a respective display device and a local server;
   a receiving unit in communication with the plurality of terminals receiving first program guide data in a first program guide object and communicating the first program guide object to the plurality of terminals;
   a local video source generating local video content;
   a user interface coupled to the local server communicating local channel grid guide data to the local server, said local channel grid guide data comprising channel features of a new local channel comprising a channel number, a program name, a network identifier, a description and a start time;
   said local server in communication with the plurality of terminals and the local video source, said local server separate from the plurality of terminals, said local server comprising a local guide generator, said local server generating second program guide data as a local program guide object corresponding to the local content from the local video source through the local network using an internet protocol, said local server providing a boot object for mimicking an artificial broadcast network being added, said local server, announcing the artificial broadcast network by communicating the boot object from the local server to the plurality of terminals and providing the local channel grid guide data to the plurality of terminals by communicating the local program guide object to the plurality of terminals; and
   said plurality of terminals, in response to announcing, rebooting and modifying a standard grid guide comprising the first program guide data with the local channel grid guide data from the local program guide to form a modified grid guide using the local program guide object and displaying the modified grid guide based on the network identifier and the channel number of the new local channel.

14. A system as recited in claim 13 wherein the local server receives the local content and encodes the local content into an encoded local video signal and communicates the encoded local video signal to the plurality of terminals.

15. A system as recited in claim 13 wherein the local video source comprises at least one selected from a camera, an ATSC source, an NTSC source, a video player, a barker data module an announcement module, and a conference channel.

16. A system as recited in claim 13 wherein the receiving unit communicates base content to the plurality of terminals.

17. A system as recited in claim 13 wherein the local server comprises communicates the boot object to a first group of the plurality of terminals and not to a second group of the plurality of terminals.

18. A system as recited in claim 13 wherein the second program guide data comprises a channel number program name, a short description, a long description, a duration, and an end time.

19. A system as recited in claim 13 wherein the plurality of terminals is disposed within a building.

20. A system as recited in claim 13 wherein the plurality of terminals is disposed within a vehicle.

* * * * *